United States Patent
Crockett et al.

(10) Patent No.: US 7,792,336 B2
(45) Date of Patent: Sep. 7, 2010

(54) SIGNATURE CAPTURE AESTHETIC/TEMPORAL QUALIFICATION FAILURE DETECTION

(75) Inventors: Timothy W. Crockett, Raleigh, NC (US); Phuc Ky Do, Morrisville, NC (US); Justin M. Pierce, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 11/464,843

(22) Filed: Aug. 16, 2006

(65) Prior Publication Data

US 2008/0044065 A1    Feb. 21, 2008

(51) Int. Cl.
- G06K 9/36 (2006.01)
- G06K 9/22 (2006.01)
- G06K 5/00 (2006.01)
- H04L 9/32 (2006.01)

(52) U.S. Cl. .................. 382/119; 382/235; 382/314; 713/176; 235/380

(58) Field of Classification Search .......... 382/100, 382/115, 119, 232, 124, 187, 181, 312, 313, 382/314; 713/182, 185, 186, 150, 168, 176; 345/156, 179, 173; 705/75, 64, 50; 178/18.01, 178/18.03, 18.05, 19.01; 340/5.1, 5.8, 5.81, 340/5.82, 5.83, 5.86; 235/380, 383, 379

See application file for complete search history.

(56) References Cited

U.S. PATENT DOCUMENTS

| | | | |
|---|---|---|---|
| 3,629,826 A | 12/1971 | Cutaia et al. | |
| 4,379,282 A | 4/1983 | Bailey | |
| 4,803,734 A | 2/1989 | Onishi et al. | |
| 5,283,557 A * | 2/1994 | Memarzadeh | 345/698 |
| 5,313,253 A | 5/1994 | Martin et al. | |
| 5,652,806 A * | 7/1997 | Friend | 382/175 |
| 6,873,715 B2 * | 3/2005 | Kuo et al. | 382/119 |
| 6,907,132 B1 | 6/2005 | Salomon | |
| 6,940,999 B2 | 9/2005 | Lin | |
| 2005/0033704 A1 | 2/2005 | Kirk | |
| 2006/0138228 A1 * | 6/2006 | Sanders et al. | 235/435 |

* cited by examiner

*Primary Examiner*—Sheela C Chawan
(74) *Attorney, Agent, or Firm*—Cantor Colburn LLP; Jason O. Piche

(57) ABSTRACT

A method and system for detecting that a signature capture device is not performing optimally by analyzing captured signatures for either aesthetic quality or expected form, wherein the signature capture device performs the aesthetic quality or expected form analysis and wherein the analysis is performed by software external to the signature capture device.

15 Claims, 4 Drawing Sheets

SIGNATURE CAPTURE AESTHETIC/TEMPORAL QUALIFICATION FAILURE DETECTION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to a point-of-sale (POS) systems, and particularly to a POS systems that are capable of detecting a failure or an imminent failure.

2. Description of Background

Computer systems that accept data streams generated by operating a stylus are commonplace. A stylus based user interface generally comprises a pen (called a stylus) and a digitizing tablet. The use of stylus-based user interfaces is being driven by the general trend toward more natural user interfaces utilizing handwriting and freehand drawing.

In many application programs, stylus-based user interfaces are superior to keyboards as a means for entering data. Such is the case, for instance, when a user of the computer has only one hand available for data entry. Other cases include, but are not limited to, those in which a keyboard would add too much bulk or weight to a data processing system designed to be highly portable or the case of a system designed for operation by a user who does not know how to or is physically unable to type.

However, an input stream from a stylus-based user interface is more difficult for the system to interpret and makes the development of stylus-based application programs very complex. The input stream of a keyboard or mouse unambiguously reflects a user's intention, that is, to select a particular keyboard key or mouse button. The application program may or may not be able to respond meaningfully to that particular input data.

The stylus-based user interface, on the other hand, functions as a source of both character data (such as text, function keys and editing commands) and gesture data (i.e., mouse data such as pointing and selecting). Regardless of which of these two types of data the user intends to enter, the input data stream of the stylus-based user interface consists of a series of x-y coordinate pairs (called x-y data) that describe the locus of the stylus as the user operates it. Stroke data are generated from the x-y data. Stroke data represent strokes, which are sequences of the x-y coordinate pairs delimited by a pen-down event and a pen-up event. A pen-down event occurs when the stylus first touches the digitizing pad. A pen-up event occurs when the stylus next leaves the digitizing pad.

Some application programs, such as a sketching application or a signature capture application program, are required to deal directly with these strokes. Most application programs, however, are required only to deal with the character data represented by the strokes. Accordingly, stroke data is interpreted before an application program can process it. The interpretation may involve classifying the stroke data as gesture or character data, and/or converting them to character data. Accordingly, interpreting stroke data is a complex process, which generally requires much programmer time to implement, and much Central Processing Unit (CPU) to run.

In addition, in self-service environments it is important that Point of Service (POS) hardware be capable of detecting its failure or imminent failure. Signature capture devices do not appear to have any means of providing such information. Thus, it is well known that POS systems such as signature capture devices do not provide for an automatic failure detection mechanism. Therefore, it is desired to develop a method for detecting irregular flaws when a user uses a signature capture device.

SUMMARY OF THE INVENTION

The shortcomings of the prior art are overcome and additional advantages are provided through the provision of a method for detecting that a signature capture device is not performing optimally by analyzing captured signatures for either aesthetic quality or expected form.

The shortcomings of the prior art are overcome and additional advantages are provided through the provision of a method for detecting that a signature capture device is not performing optimally by analyzing temporal aspects of a data stream generated by signatures captured by the signature capture device.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that provides for a system and a method for detecting a failure or an imminent failure of a signature capture device.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
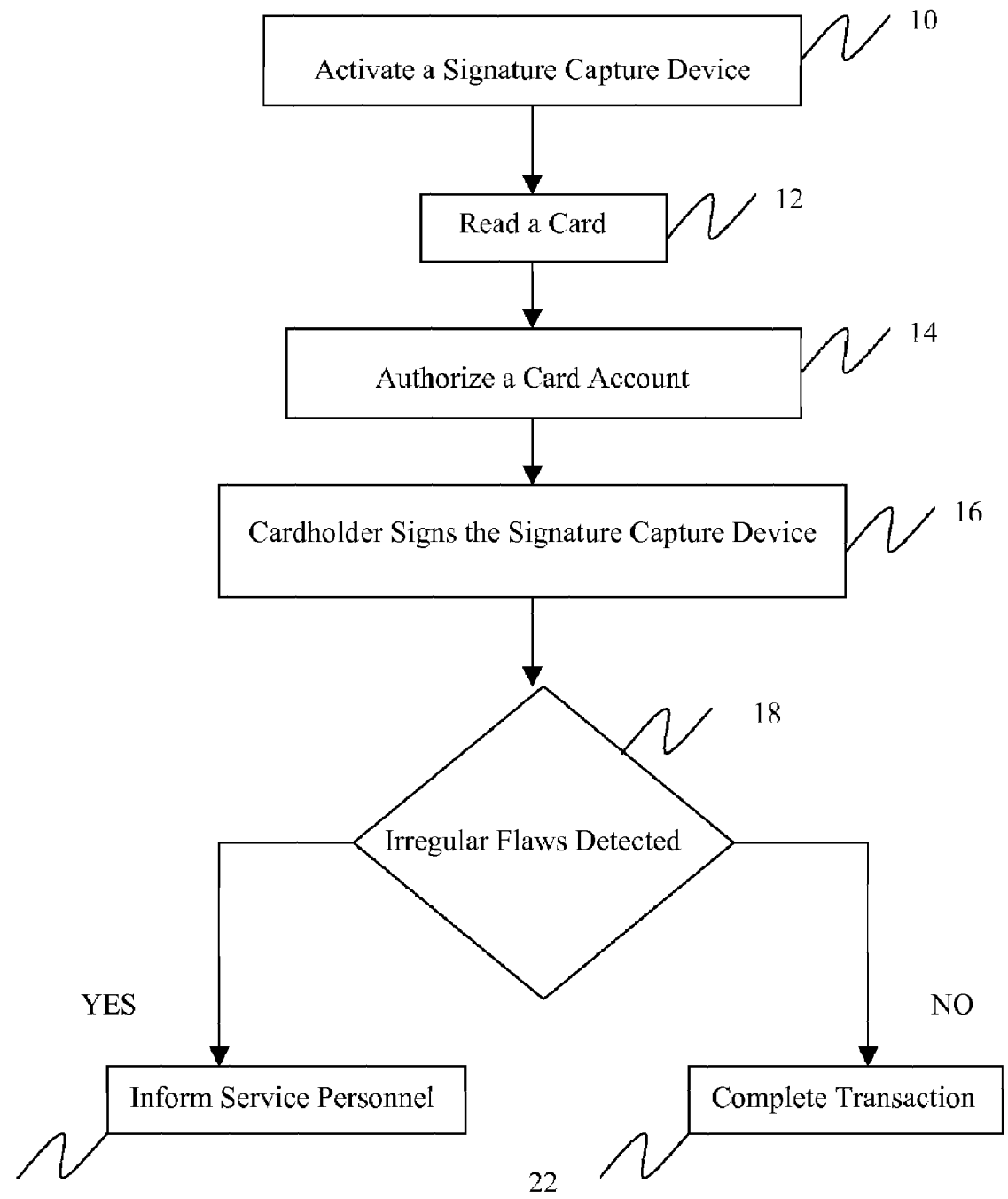
FIG. 1 illustrates one example of a flowchart of a card verification process at a retail point-of-sale (POS)

One aspect of the exemplary embodiments is a method for detecting a failure or an imminent failure of a signature capture device. Another aspect of the exemplary embodiments is a method for detecting irregular flaws by analyzing the number of "jumps" and the time it takes for one or more of the jumps to occur.

The exemplary embodiments takes advantage of signature capture technology and signature verification technology to perform automatic signature verification and automatic signature failure, where a point-of-sale (POS) operator is only involved for initialization processing.

Most people have a smooth flowing signature. Statistically, a signature capture device should expect such smooth signatures on a regular basis. However, frequently when a signature capture device begins to fail, the capture of the signature becomes choppy, skewed or incomplete. An appropriate algorithm could detect irregular flaws in a signature. If a device begins detecting poor signatures at a statistically improbable rate, it can be interpreted as an indication of possible failure and may notify a systems management infrastructure.

In addition to aesthetic quality, the incoming stream of point data can be analyzed for "jumps" or expected form. When a person signs their name, that person frequently lifts the stylus several times during this process. The lifting time of the stylus has been measured to be approximately 200 ms. In signature devices that are failing, the interpreted location of the stylus can jump many pixels at a time in time periods unachievably fast for a person. An algorithm detecting the number of jumps would be dependent on the hardware (pixel count, sampling rate, etc.). However, the algorithm could be programmed to, for example, detect a problem if it is detected that 15 pixels or more are jumped in less than 10 ms.

There are several types of sub-algorithms that may be used to determine whether a signature capture device violates average expected outputs of a master algorithm. In general, the sub-algorithms fall into the two classes, which are "aesthetic" or "temporal." The temporal sub-algorithms examine data that is streaming in from the device while the aesthetic algorithms look at the final signature as a whole (as if it were a plot or graph). Both work to detect when a certain type of irregularity in a signature has occurred and report this back to the master algorithm. The master algorithm keeps track of the average occurrence of these irregularities and checks its data against the expected averages. Expected averages are defined by the manufacturer and might even vary by region (e.g., Chinese signatures may fail against English aesthetic averages). In other words, the aesthetic quality or the expected form of the captured signatures may be assessed based on geographical region or based on expected language of a geographical region in which the signature capture device is in use.

For example, a temporal sub-algorithm that detects 2 tandem points in the customers signature are separated by a distance greater than 0.25 inches and that the time reported between the two points was less than 10 ms may notify the POS operator of an irregularity. (Both the 0.25 in and 10 ms values could vary by device capability and are only exemplary values). This distance variation would be detected by the temporal sub-algorithm as an irregularity, and it would report back to the master algorithm. If this oddity was occurring on the device more than the manufacturer defined expected average, the master algorithm might then take the step of flagging the device as failing/failed. Here, flagging simply means that it might send a notification to a host or driver, turn on an LED, set an internal flag, etc. Therefore, after detecting that the signature capture device may not be performing optimally, one or more of the following tasks may take place: a visible signal on the signature capture device is activated, a device driver is notified, a software system is notified or service personnel are notified.

Referring to FIG. 1, a flowchart of a card verification process at a retail point-of-sale (POS) is presented. The process begins at step 10 when a POS operator activates a signature capture device. In step 12, an authorization process is performed in which data is read from the card. In step 14, the card number is sent to a remote credit card host (not shown) for purposes of authorizing the account number and the amount of the charge. At step 16, after account authorization, the cardholder signs on the signature capture device. According to conventional methods of credit card acceptance guidelines, the POS operator is required to verify the cardholder signature in step 16 by visually comparing the provided signature with a signature on the back of the credit card to determine if there is an acceptable match. However, in the exemplary embodiments of the present invention the signature capture device automatically determines irregular flaws at step 18. If an irregularity is detected, the process flows to step 20 to inform service personnel to check the device, not to interfere with the checkout process. If the signature is deemed to be acceptable, the process flows to step 22 and the credit card transaction is completed. In other words, the checkout process is always completed, even if the device is flagged as possibly failing.

Figure 2:
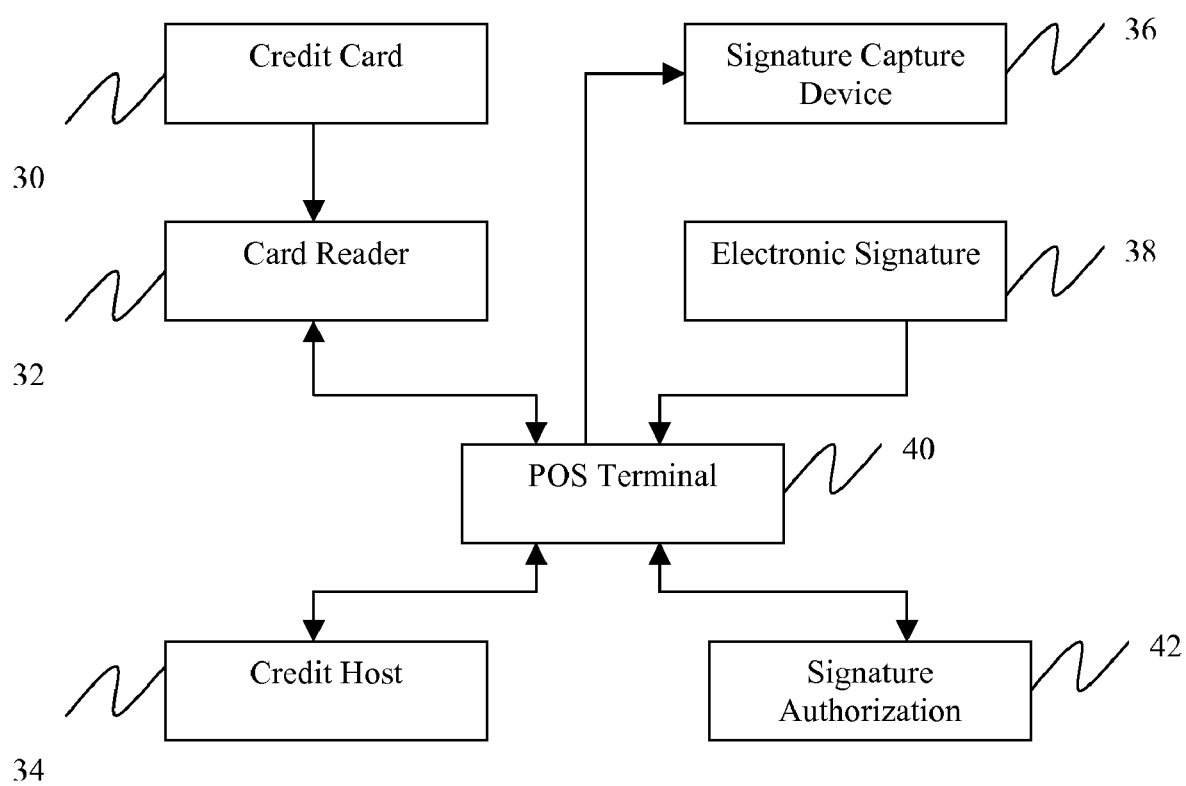
FIG. 2 illustrates one example of a block diagram illustrating an automatic signature verification system for retail transactions.

Referring to FIG. 2, a block diagram is illustrated having an automatic signature verification system for retail transactions. The system includes a point-of-sale (POS) terminal 40 coupled to a card reader 32, a signature capture device 36, and a credit host 34. During a retail transaction, the card reader 32 is used to read data from a credit card 30. The card 30 may include a conventional credit card or a smart card. The POS terminal 40 transmits the data to the credit host 34 for account authentication. The POS terminal 40 also controls the signature capture device 36 for prompting the cardholder to write a signature for electronic capture. In one embodiment, the POS terminal 40, the card reader 32, and the signature capture device 36 are located within the same retail establishment. In an alternative embodiment, the POS terminal 40 may be located remote from the card reader 32 and the signature capture device 36. According to the exemplary embodiments of the present invention, the POS terminal 40 is further coupled to a signature authorization system 42.

Concerning the temporal sub-algorithm, the time between two tandemly recognized points is commensurate with the amount of time a person requires to move the distance between those points during an average signature. When the system detects the pen is raised off the signature capture area, the time it takes for the pen to return should be measured. On average, it should be the average time that a person takes to consciously lift and reset a pin during a signature. If it is substantially quicker, an area of the screen may be failing to register the pen.

Figure 3:
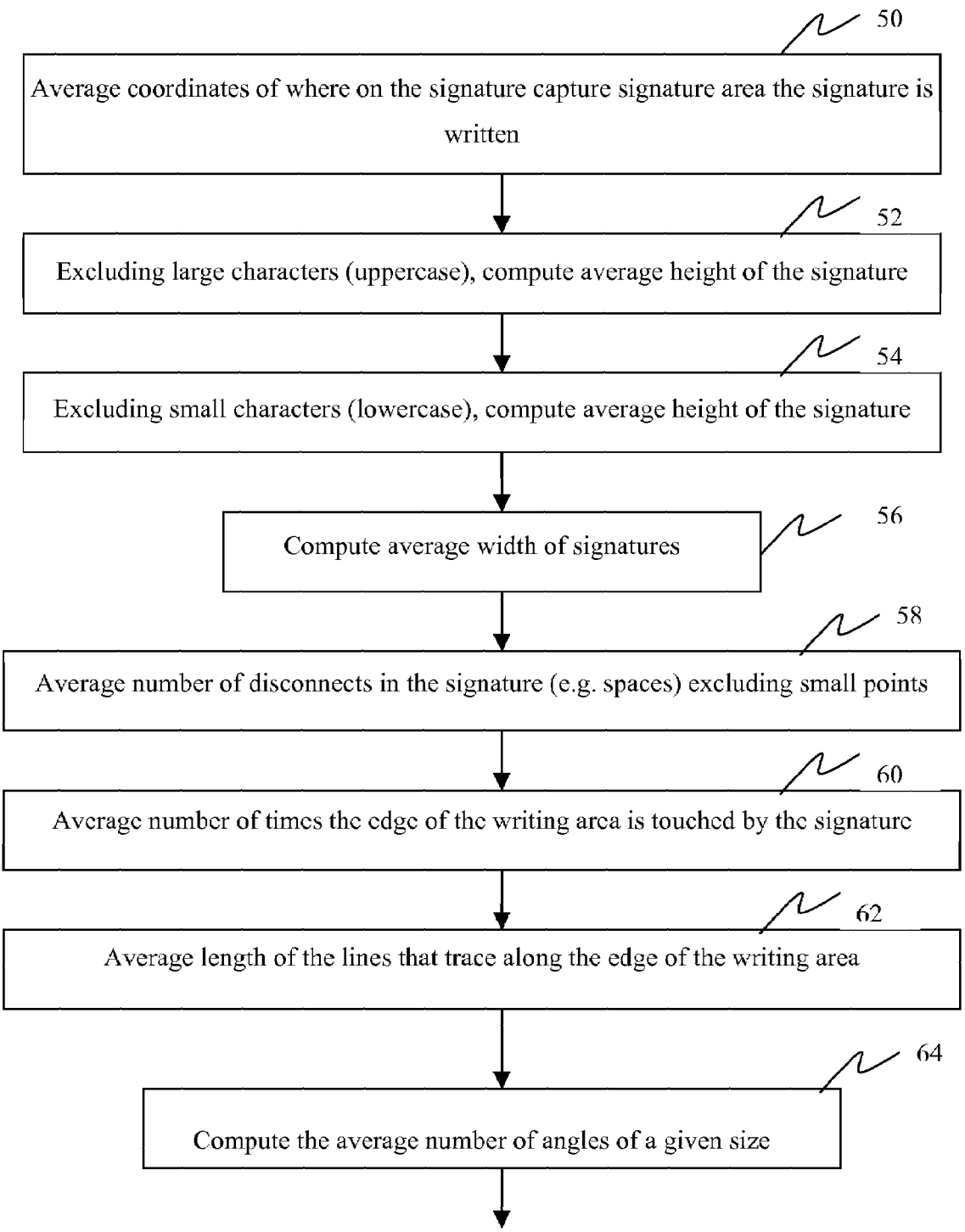
FIGS. 3-4 illustrate one example of a flowchart illustrating the detection of irregular flaws in a signature.
Figure 4:
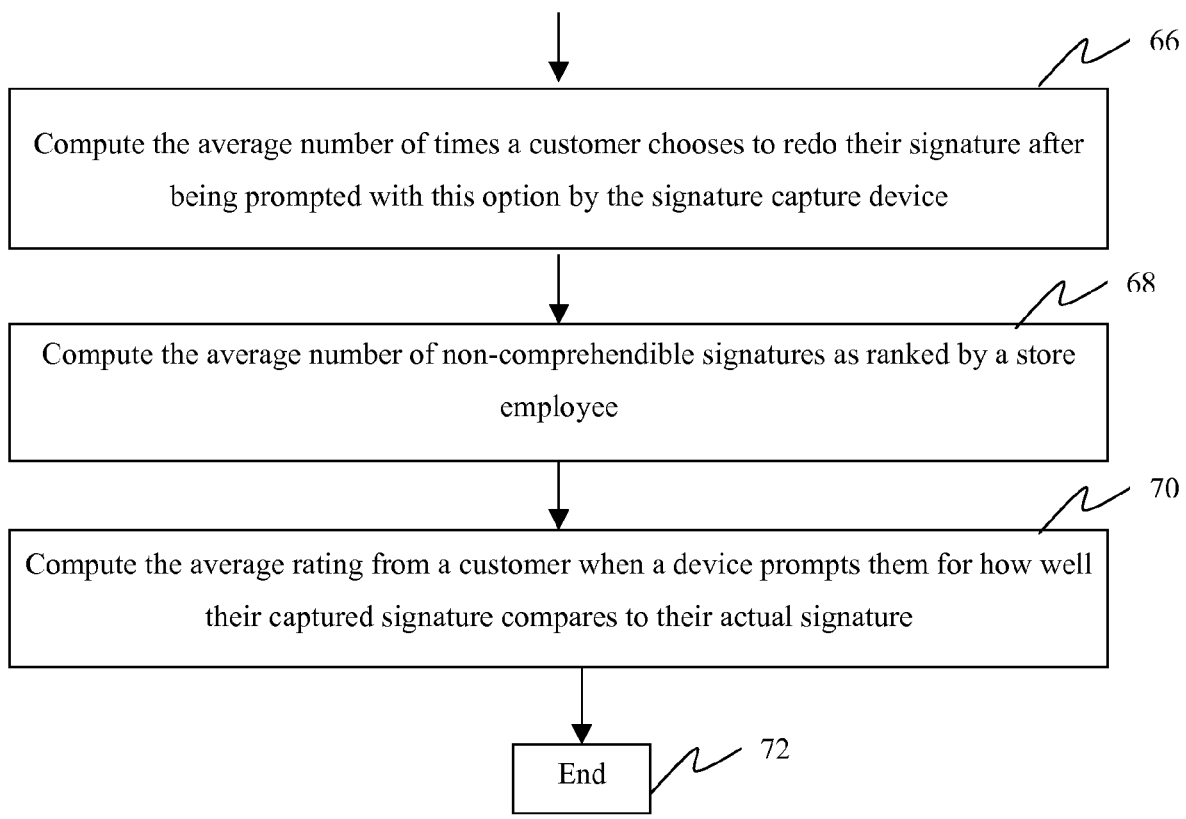

Referring to FIG. 3, concerning the aesthetic sub-algorithm, the following steps are performed to illustrate the detection of irregular flaws in a signature. In step 50, the average coordinates are computed of where on the signature capture signature area the signature is written. In step 52, the average height of the signature is computed, excluding large characters (uppercase). In step 54, the average height of the signature is computed, excluding small characters (lowercase). In step 56, the average width of signatures is computed. In step 58, the average number of disconnects in the signature (e.g. spaces) excluding small points (e.g., the dotting of the 'i') are computed. In step 60, the average number of times the edge of the writing area is touched by the signature is computed. In step 62, the average length of the lines that trace along the edge of the writing area is computed. These aesthetic measurements may then be compared to reference aesthetic measurements to detect irregular flaws in a signature. In addition, the device may execute the following steps in analyzing signatures. In step 64, the device computes the average number of angles of a given size (e.g., $0 > x <= 10$ degrees, $10 > x <= 20$) in various orientations (e.g., up, down, left, right). In step 66, the device computes the average number of times a customer chooses to redo his/her signature after being prompted with this option by the signature capture device. In step 68, the device computed the average number of non-comprehendible signatures as ranked by a store employee (perhaps they are prompted to judge a random sample of signature's for accuracy). In step 70, the device computes the average rating from a customer when a device prompts them for how well their captured signature compares to their actual signature. In step 72, the process terminates.

Fluctuations in the average outcomes of sub-algorithms in FIG. 3 might indicate that a portion of the screen has become unusable (e.g., etched) and the signer is avoiding it. It could mean that the user is physically obstructed. It could mean that the system is no longer calibrated. It is not necessarily important to determine which of the array of problems is actually happening. It is only important that service personnel are notified that the device is potentially failing.

In summary, the aesthetic quality or the expected form of the captured signatures is assessed by computing one or more metrics for one or more geometric/aesthetic/perceived characteristics of incoming signatures by aggregating each of the one or more computed metrics, comparing aggregate values with predetermined aggregate values, and wherein if a deviation of one or more of the aggregate values from the predetermined aggregate values is detected, a signal that the signature capture device is not performing optimally is received by service personnel.

In addition, the one or more metrics gathered and aggregated include one or more of the following characteristics: determining coordinates of a bounding rectangle on a signature capture writing area of the signature capture device in which a signature is drawn, determining a height of the signature, determining a height of the signature excluding large characters, determining a height of the signature excluding small characters, determining a number of disconnected elements in the signature, determining a number of disconnected elements in the signature excluding small geometry, determining a number of times the signature contacts an edge of the signature capture device writing area, determining a length of lines that are drawn along the edge of the signature capture device writing area, determining a number of angles of varying size and orientation of the angles, determining a number of times a user chooses to redo the signature when prompted with that option, determining a ranking given by a user when prompted to rank the signature, as recorded by the signature capture device, determining a ranking given by store employees when prompted to rank the signature being recorded by the device, determining a number of letters in the signature that are matched using character recognition technology, and determining a number of letters in the signature that are matched using a combination of character recognition technology and expected character data gathered from user information.

Therefore, when a customer signs a signature capture device, they have typically already swiped a credit card that includes the customer's name. This data can be used to help determine whether the signature provides a close match to the actual name (this can take into account common nicknames, excluded or added middle names, initials, etc.). It could also work backwards from the end of the name and only attempt analysis on the last name (as there would be less variance).

When the master algorithm detects what it believes to be a failing device, it can notify service personnel in any number of ways. This could be as complex as sending a real-time electronic notification or as simple as setting an internal bit that a device driver can then check. The master algorithm and sub-algorithms may be implemented inside the signature capture device or by a separate device driver (software running on the host computer to which the signature capture device is attached), so the possibilities of what could happen when a failure is detected are virtually limitless.

In general, the master algorithm, which includes one or more sub-algorithms, does not attempt to detect a failure before a signature is completed. For every given signature capture device, there is no algorithm that can perfectly detect whether any given signature is what a person intended. Instead, the master algorithm relies on expected averages for the sub-algorithms to determine when a device is likely failing. Of course, extremely unexpected oddities may only occur once or twice before the master algorithm takes action.

In addition, it is noted that the signature capture device performs the aesthetic quality or expected form analysis. The analysis may be performed by software that is external to the signature capture device. Also, any predetermined values associated with the captured signatures may be configurable.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for detecting that a signature capture device is not performing optimally comprising:
analyzing captured signatures for either aesthetic quality or expected form, wherein the aesthetic quality or the expected form of the captured signatures is assessed by computing one or more metrics for one or more geometric/aesthetic/perceived characteristics of incoming signatures;
aggregating each of the one or more computed metrics; and
comparing aggregate values with predetermined aggregate values;
wherein if a deviation of one or more of the aggregate values from the predetermined aggregate values is detected, a signal capture device is not performing optimally is received by service personnel.

2. The method of claim 1, wherein the signature capture device performs the aesthetic quality or expected form analysis.

3. The method of claim 2, wherein the analysis is performed by software external to the signature capture device.

4. The method of claim 1, wherein the aesthetic quality or the expected form of the captured signatures is assessed based on geographical region.

5. The method of claim 1, wherein the aesthetic quality or the expected form of the captured signatures is assessed based on expected language of a geographical region in which the signature capture device is in use.

6. The method of claim 1, wherein the aesthetic quality or the expected form of the captured signatures is assessed based on language selected by a user of the signature capture device.

7. The method of claim 1, wherein, after detecting that the signature capture device may not be performing optimally, one or more of the following actions takes place:
- a visible signal on the signature capture device is activated;
- a device driver is notified;
- a software system is notified; or
- service personnel are notified.

8. The method of claim 1, wherein the one or more metrics gathered and aggregated include one or more of the following characteristics:
- determining coordinates of a bounding rectangle on a signature capture writing area of the signature capture device in which a signature is drawn;
- determining a height of the signature;
- determining a height of the signature excluding large characters;
- determining a height of the signature excluding small characters;
- determining a number of disconnected elements in the signature;
- determining a number of disconnected elements in the signature excluding small geometry;
- determining a number of times the signature contacts an edge of the signature capture device writing area;
- determining a length of lines that are drawn along the edge of the signature capture device writing area;
- determining a number of angles of varying size and orientation of the angles;
- determining a number of times a user chooses to redo the signature when prompted with that option;
- determining a ranking given by a user when prompted to rank the signature, as recorded by the signature capture device;
- determining a ranking given by store employees when prompted to rank the signature being recorded by the device;
- determining a number of letters in the signature that are matched using character recognition technology; and
- determining a number of letters in the signature that are matched using a combination of character recognition technology and expected character data gathered from user information.

9. The method of claim 1, wherein the predetermined values are configurable.

10. A method for detecting that a signature capture device is not performing optimally comprising:
- analyzing temporal aspects of a data stream generated by signatures captured by the signature capture device, wherein one or more metrics for temporal characteristics of signature data is computed for incoming signatures; and
- analyzing the computed metrics for unexpected values;
- wherein the unexpected values are used to determine whether a signature capture device is performing optimally;
- wherein one or more of the following temporal characteristics is monitored and analyzed to assess whether the signature capture device is performing optimally by:
- determining a minimum time between two tandemly recognized points of varying distance of separation;
- determining a minimum time between a writing device detected as being lifted from the drawing area and the writing device detected as being returned to drawing area events;
- determining a maximum time between two tandemly recognized points of varying distance of separation;
- determining a maximum time between pen-up and pen-down events;
- determining an amount of time the user spent with the writing device contacting the drawing area; and
- determining a total amount of time the user spent writing the signature.

11. The method of claim 10, wherein the signature capture device performs temporal analysis.

12. The method of claim 11, wherein the temporal analysis is performed by software external to the signature capture device.

13. The method of claim 10, wherein, after detecting that a signature capture device may not be performing optimally, one or more of the following actions takes place:
- a visible signal on the device is activated;
- a device driver is notified;
- a software system is notified; or
- service personnel are notified.

14. A system for detecting that a signature capture device is not performing optimally, the system:
- a processor analyzing captured signatures for either aesthetic quality or expected form wherein the aesthetic quality or the expected form of the captured signatures is assessed by computing one or more metrics for one or more geometric/aesthetic/perceived characteristics of incoming signatures:
- aggregating each of the one or more computed metrics; and
- comparing aggregate values with predetermined aggregate values;
- wherein if a deviation of one or more of the aggregate values from the predetermined aggregate values is detected, a signal that the signature capture device is not performing optimally is received by service personnel.

15. The system of claim 14, wherein the one or more metrics gathered and aggregated include one or more of the following characteristics:
- determining coordinates of a bounding rectangle on a signature capture writing area of the signature capture device in which a signature is drawn;
- determining a height of the signature;
- determining a height of the signature excluding large characters;
- determining a height of the signature excluding small characters;
- determining a number of disconnected elements in the signature;
- determining a number of disconnected elements in the signature excluding small geometry;
- determining a number of times the signature contacts an edge of the signature capture device writing area;
- determining a length of lines that are drawn along the edge of the signature capture device writing area;
- determining a number of angles of varying size and orientation of the angles;
- determining a number of times a user chooses to redo the signature when prompted with that option;
- determining a ranking given by a user when prompted to rank the signature, as recorded by the signature capture device;
- determining a ranking given by store employees when prompted to rank the signature being recorded by the device;
- determining a number of letters in the signature that are matched using character recognition technology; and
- determining a number of letters in the signature that are matched using a combination of character recognition technology and expected character data gathered from user information.

* * * * *